United States Patent [19]
Stagg

[11] 3,879,701
[45] Apr. 22, 1975

[54] PASSIVELY ACQUIRED BEARING TO ACTIVE SONAR SOURCE

[76] Inventor: Gerald W. Stagg, 1014 Flint Ave., Laramie, Wyo. 82070

[22] Filed: Aug. 17, 1973

[21] Appl. No.: 389,108

[52] U.S. Cl.............. 340/6 R; 340/3 C; 340/16 R; 343/113 R
[51] Int. Cl............................................. G01s 3/80
[58] Field of Search................ 340/3 C, 6 R, 16 R; 343/113 R

[56] References Cited
UNITED STATES PATENTS

| | | |
|---|---|---|
| 3,490,024 | 1/1970 | Sherrill et al.............. 340/3 C |
| 3,568,141 | 3/1971 | Schwarz et al.............. 340/6 R |
| 3,747,057 | 7/1973 | Brougher.............. 340/16 R |

*Primary Examiner*—Richard A. Farley
*Attorney, Agent, or Firm*—R. S. Sciascia; G. J. Rubens; T. M. Phillips

[57] ABSTRACT

A digital sonar detection device for passively acquiring frequency bearings and general azimuth to echo ranging vessels a plurality of omnidirectional hydrophones are equally spaced in a circular array. Logic gating and frequency scrutinization is used for processing the received signals to insure no other signals will interfere.

8 Claims, 10 Drawing Figures

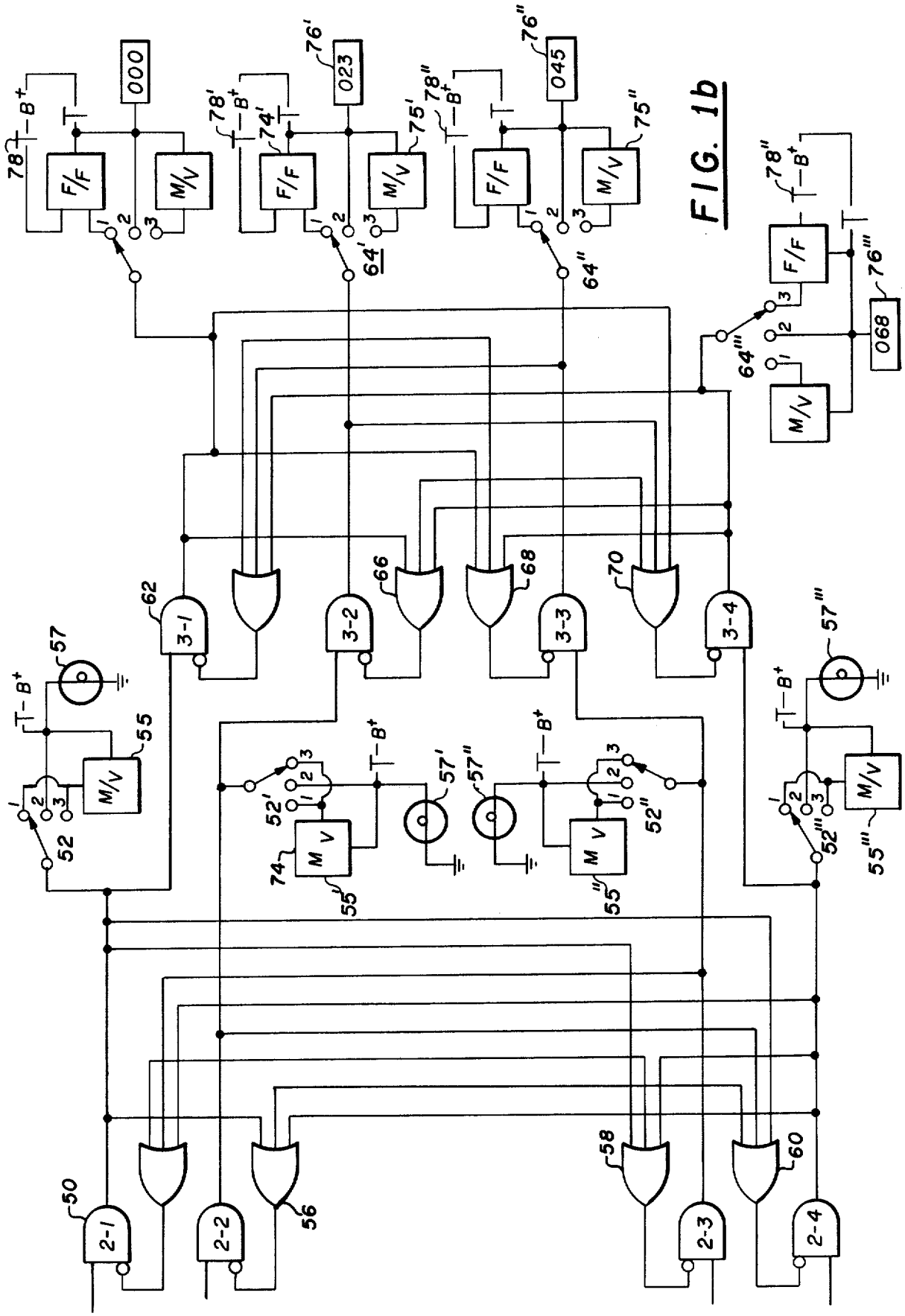

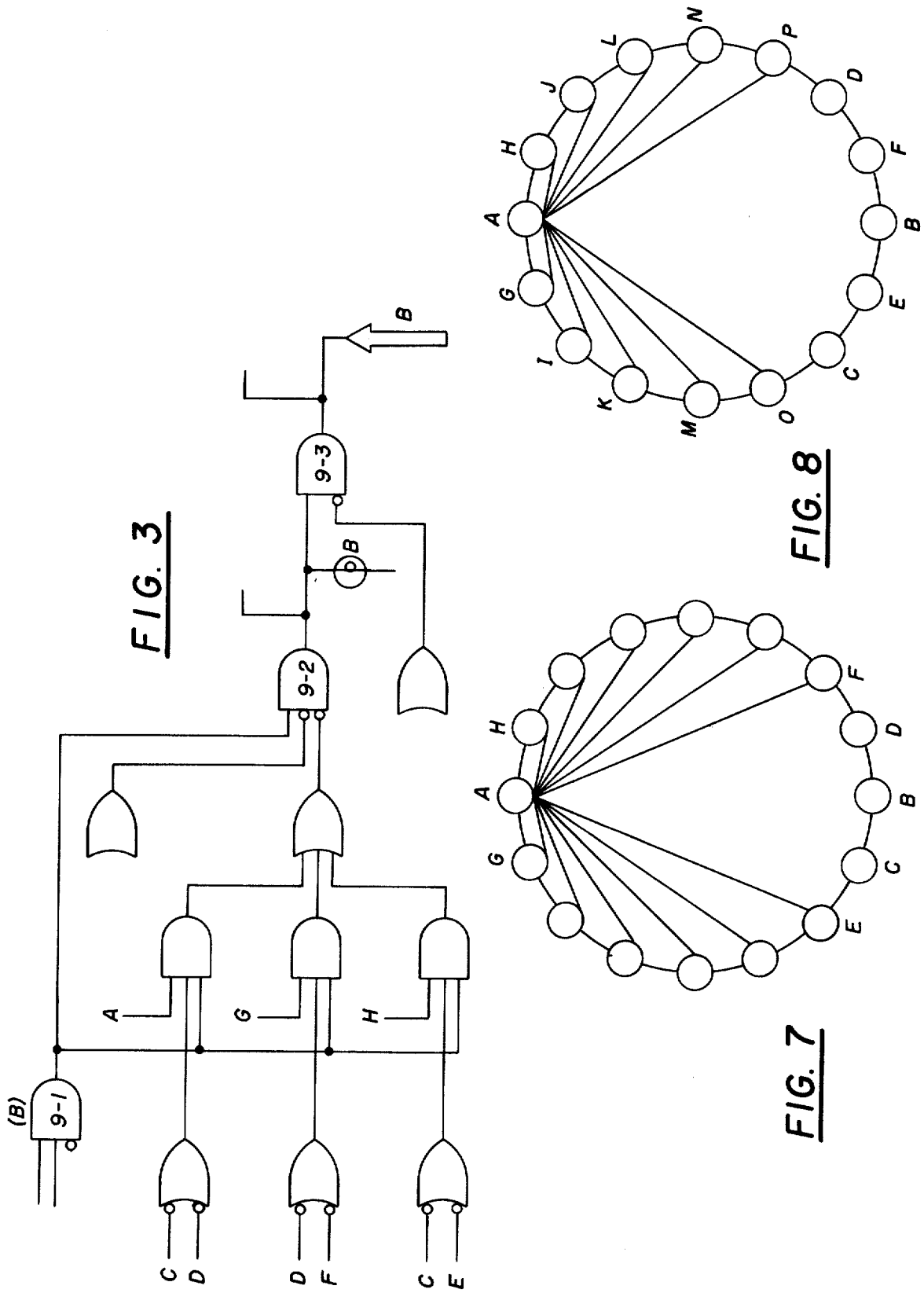

PASSIVELY ACQUIRED BEARING TO ACTIVE SONAR SOURCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to sonar systems and is particularly directed to means for processing and displaying signals received by underwater transducers.

Prior passive sonar systems of this type have suffered from poor frequency spots, very poor sensitivity, poor resolution, and were not highly reliable.

SUMMARY OF THE INVENTION

The present invention provides a passive sonar detection unit which will overcome the above mentioned disadvantages of prior known systems by providing a passive sonar detection unit comprising a plurality of omnidirectional hydrophones equally and circularly spaced forming an array for receiving a sonar signal, a plurality of means for analyzing the frequency and amplitude of each signal successively received by each hydrophone, a plurality of means for gating the signal and passing the signal only within a predetermined frequency band and amplitude, a plurality of means for inhibiting the signal on all those hydrophones except the first to receive a signal, a plurality of means for switching the first received signal to one of three modes as selected by the operator (delayed duration, automatic, manual), a plurality of means for indicating (i.e., a light) which particular hydrophone first received the signal to provide the relative bearing of the signal, and to a plurality of second switch means to provide a numerical display readout of the actual relative bearing of the signal.

In a first alternative version, the invention further includes a plurality of means for inhibiting all but two of the signals from hydrophones that are perpendicular to the hydrophone first receiving the signal. In a second alternative version, the invention further provides a plurality of means for inhibiting all but three of the signals from hydrophones that are directly opposite to the hydrophone first receiving the signal.

OBJECTS OF THE INVENTION

An object of the invention is to provide an improved passive sonar detection system which has improved frequency response, sensitivity, resolution and is considerably more reliable.

Other objects and many of the attendant advantages of this invention will become more readily appreciated as the same becomes better understood by reference to the following detailed description when considered in connection with the accompanying drawings.

BRIEF DESCRIPTION OF THE DRAWINGS

FIGS. 1a and 1b are a block diagram of a sonar system embodying the present invention;

FIG. 3 is a block diagram of a further modification of the embodiment of FIG. 1;

FIGS. 5 – 8 are diagrams used in explaining the operation of FIGS. 1 - 4, respectively;

DESCRIPTION OF THE PREFERRED EMBODIMENTS

Figure 1A:
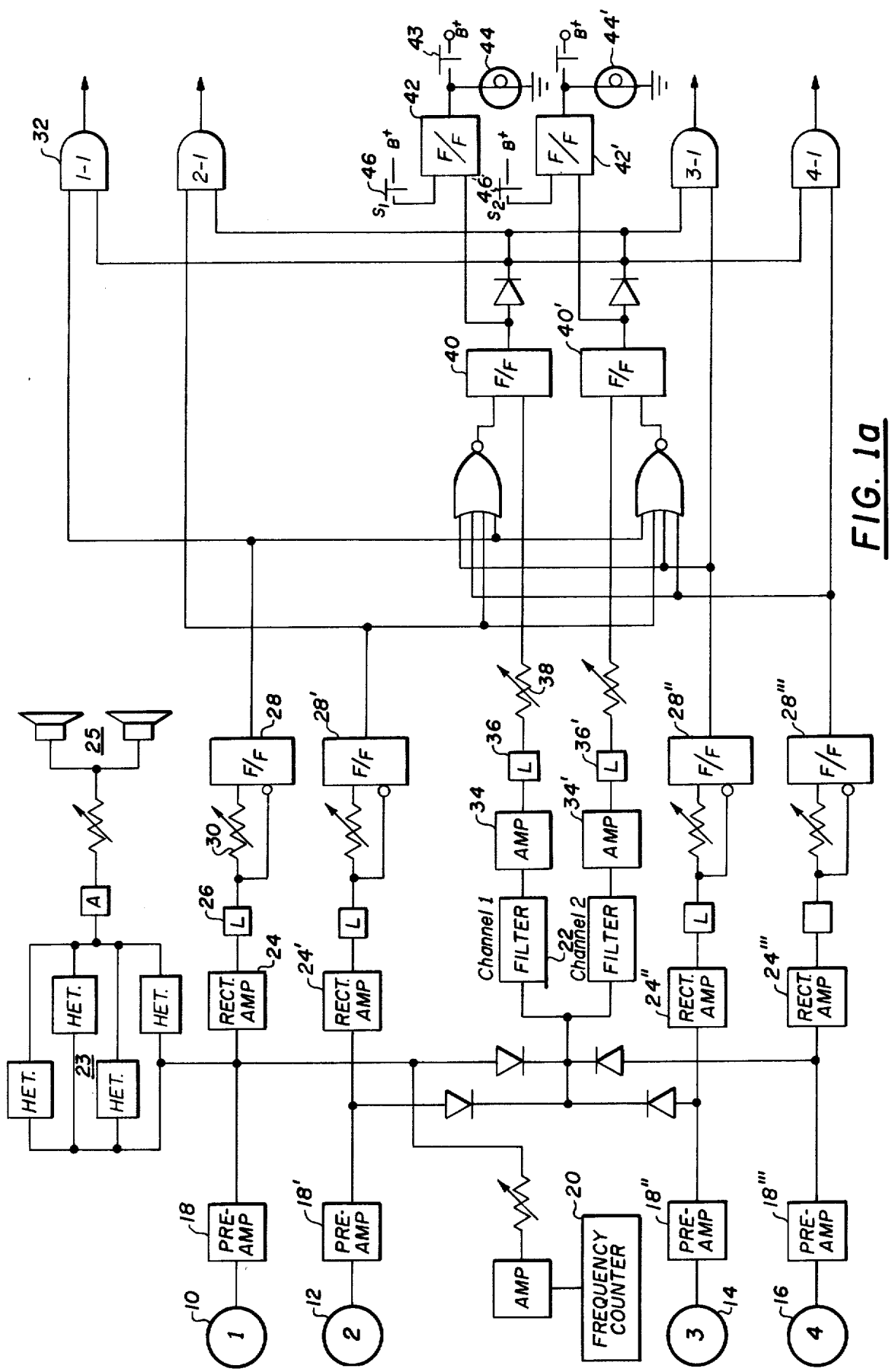
Figure 9:
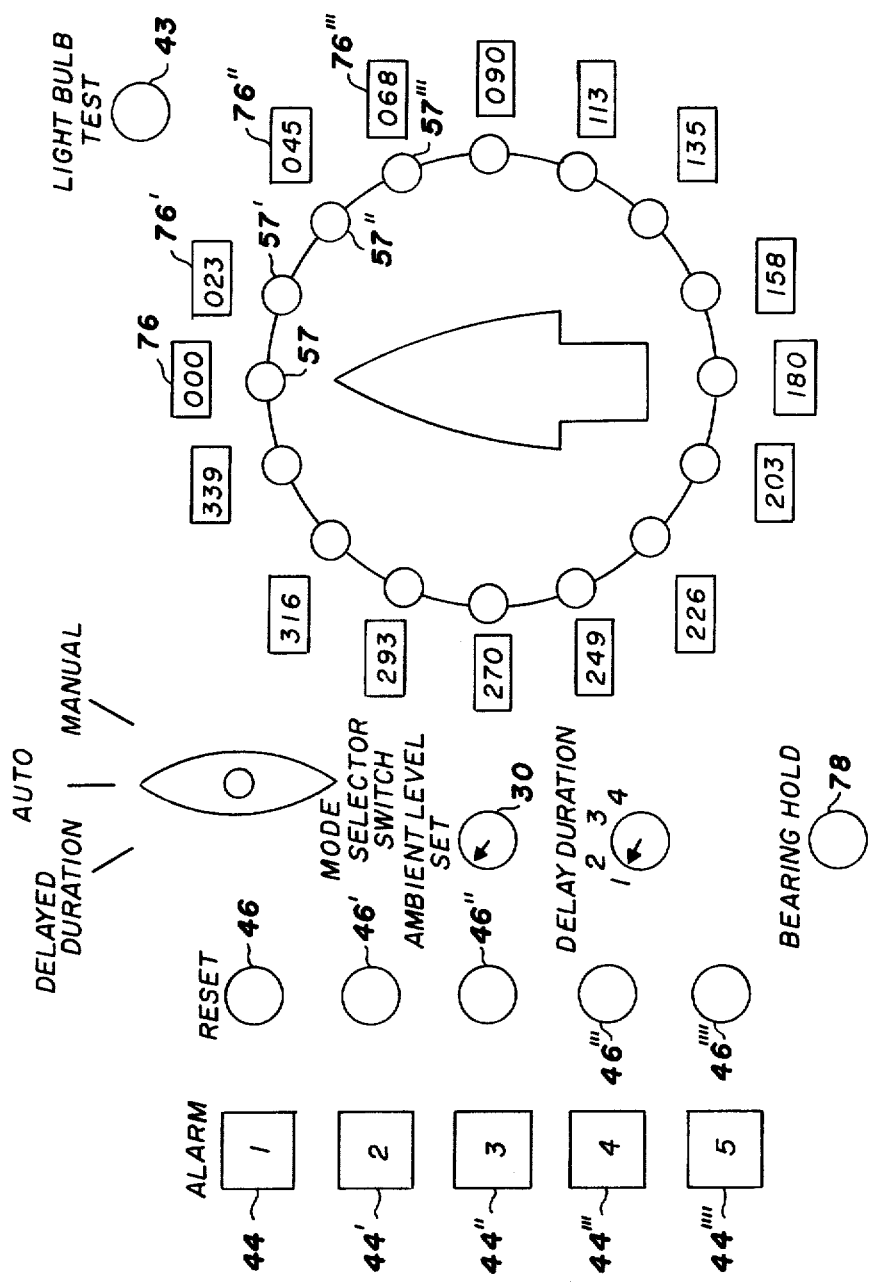
FIG. 9 is a diagrammatic showing of the display panel for the relative bearings.

Referring now to the drawings there is shown in FIG. 1 four hydrophones 10, 12, 14, and 16 representative of all hydrophones in the array. Since the hydrophones are mounted in a circular array as shown in FIGS. 5 – 9, any transmitted sound will be detected by one hydrophone first. Let it be assumed that in this case it is hydrophone 10. The detected signal in hydrophone 10 is fed to preamplifier 18 where it is amplified and fed to frequency counter 20 and to a plurality of frequency scrutinizing filters 22. Filters 22 should be of the variable band pass and should have a frequency range from 20hz to 200Khz. In the embodiment of FIG. 1 only 2 filters are shown and are part of alarm channels one and two. Only two alarm channels are shown, but it is understood that more than four channels can be used as shown in FIG. 9. When four channels are used the bandwidth of the filters could be; band 1 - 200hz ± 100hz either side of centered frequency, band 2 - 10 Khz ± 300 hz either side of the centered frequency, band 3 - 20 Khz ± 300 hz either side of centered frequency, and band 4 which is open or no filteration. The amplified signal from preamplifier 18 is also fed to rectifier amplifier 24 and to the audio circuit 23 where the signal is heterodyned in the usual manner to an audible signal from 1 Khz to 4 Khz and is amplified and expressed through the speaker system 25. The direct current voltage output from rectifier amplifier 24 is fed through a limiter circuit 26 to flip-flop circuit 28. If the amplitude of the output signal from rectifier amplifier 24 is sufficient to trigger flip-flop 28 it will disable the reset side and activate the output line with a logic 1. The trigger level of the inverter on the reset side should be lower than that of the set side to enhance the ability of flip-flop 28 to set. Variable resistor 30 is provided to vary the ambient level of flip-flop circuit 28. The value of resistor 30 should be set so that received signals will have to be above background or ambient noise to trigger flip-flop 28. The logic 1 output from flip-flop 28 is fed to AND gate 32 and will remain as long as a signal is being detected. As shown in FIG. 9 there will be five alarm channels with variable preset frequencies, and assuming that channel 1 filter is the one set on the transmitted frequency or in the open filter mode, the signal will pass to the channel 1 amplifier 34. The output from amplifier 34 is fed through limiter circuit 36 and variable resistor 38 to flip-flop circuit 40 which is already enabled by the negated reset line from the output of flip-flop 28, setting a logic 1 on AND gate 32 and also on flip-flop 42 which is always enabled. The output voltage from flip-flop 42 causes channel 1 alarm light 44 to light. Resistor 38 provides the same function as resistor 30 previously described. The channel 1 alarm light 44 is reset manually by button switch 46. Push button switch 43 is provided to test incadescent lamp 44.

To this point the incoming signal has been scrutinized as to amplitude and frequency and has set AND gate 32 to conducting. The logic 1 output from AND gate 32 is fed to AND gate 50 which is already set by a logic 1 from the negated inhibit line from all other hydrophones which are not yet stimulated by an incoming signal. A logic 1 is then fed to multi-mode switch 52 and to gates 56, 58 and 60 to inhibit or disable all other series 2 AND gates. Switch 52 may be of the wafer type with three positions or modes. The logic 1 output from gate 50 is also fed to AND gate 62 which is already set and produces a logic 1 output that is fed to switch 64 and to gates 66, 68 and 70 to inhibit or disable all other series 3 AND gates. Switch 64 may also be of the wafer type with three positions or modes and is mechanically coupled to switch 52. Position 1 or mode 1 is the manual mode for both switches 52 and 64 in which the logic 1 activates multivibrator 55 and flip-flop circuit 74. Multivibrator 55 should be a one-shot multivibrator with a variable delay or holding time from 1 to 4 seconds so that light 57 stays lighted for the desired duration. Position 1 of switch 64 activates flip-flop circuit 74 which lights bearing indicator light 76 until reset manually by push button switch 78. Position or mode 2 of switches 52 and 64 is the automatic mode and the light 57 and bearing indicator light 76 will remain lit only as long as a signal is present. Position or mode 3 of both switch 52 and 64 is the delayed duration mode in which the display time is variable dependent on the setting of the one shot multivibrators 55 and 75. In the manual mode the system will still accept and display signals of other preset frequencies, or alarm signals on the alarm channel and the entering of lights (FIG. 9) whether the previous bearing indicator light is reset or not, giving the added protection against lazy or preoccupied operators.

The other three signal channels operate identically as the hydrophone No. 1 channel as just described.

Figure 2:
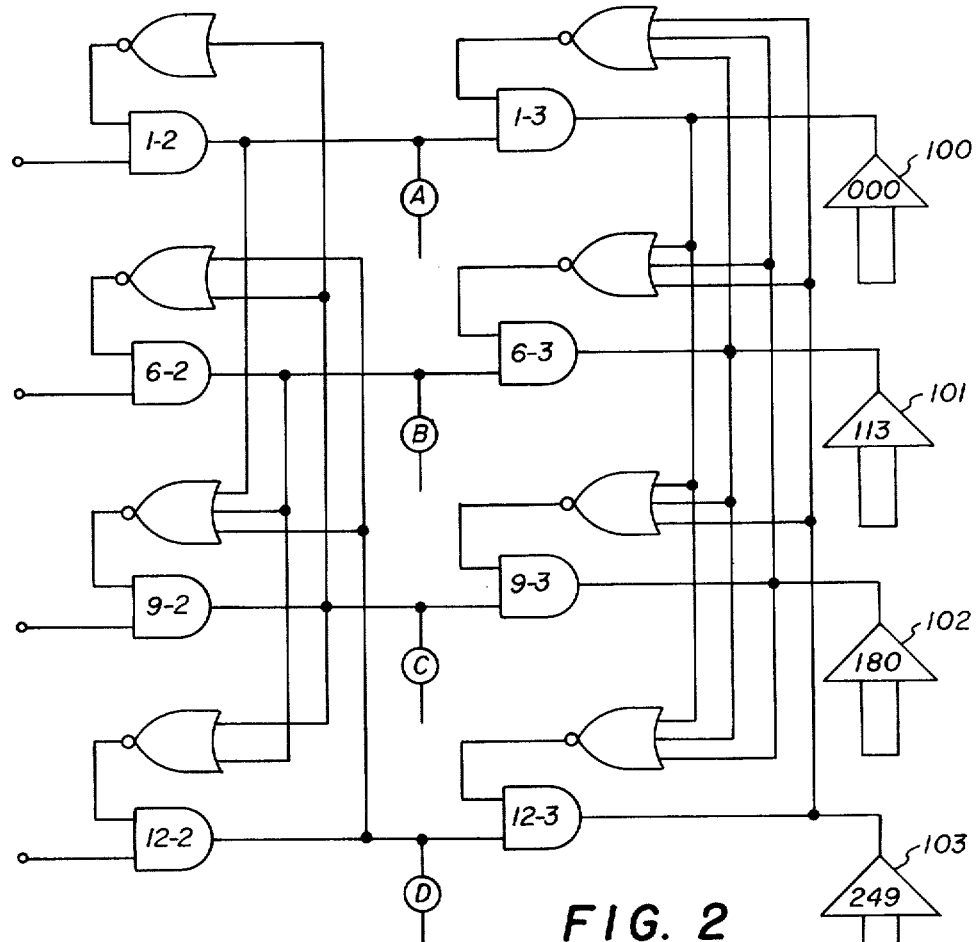
FIG. 2 is a block diagram of a modification of the embodiment of FIG. 1.
Figure 5:
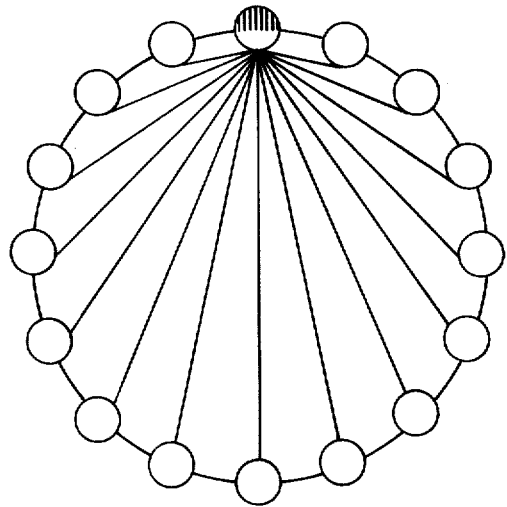
Figure 6:
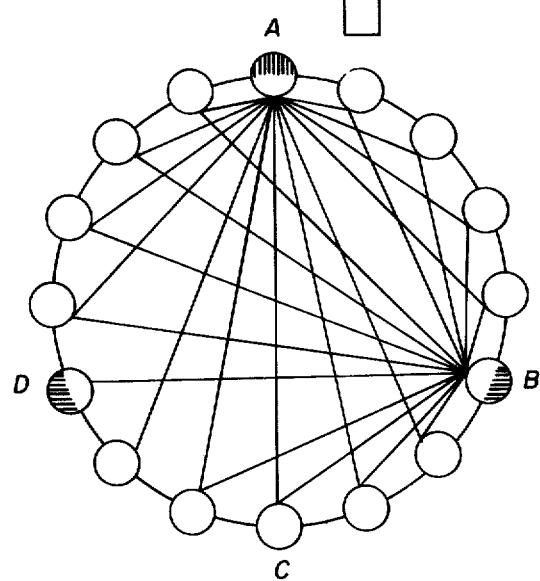
Figure 4:
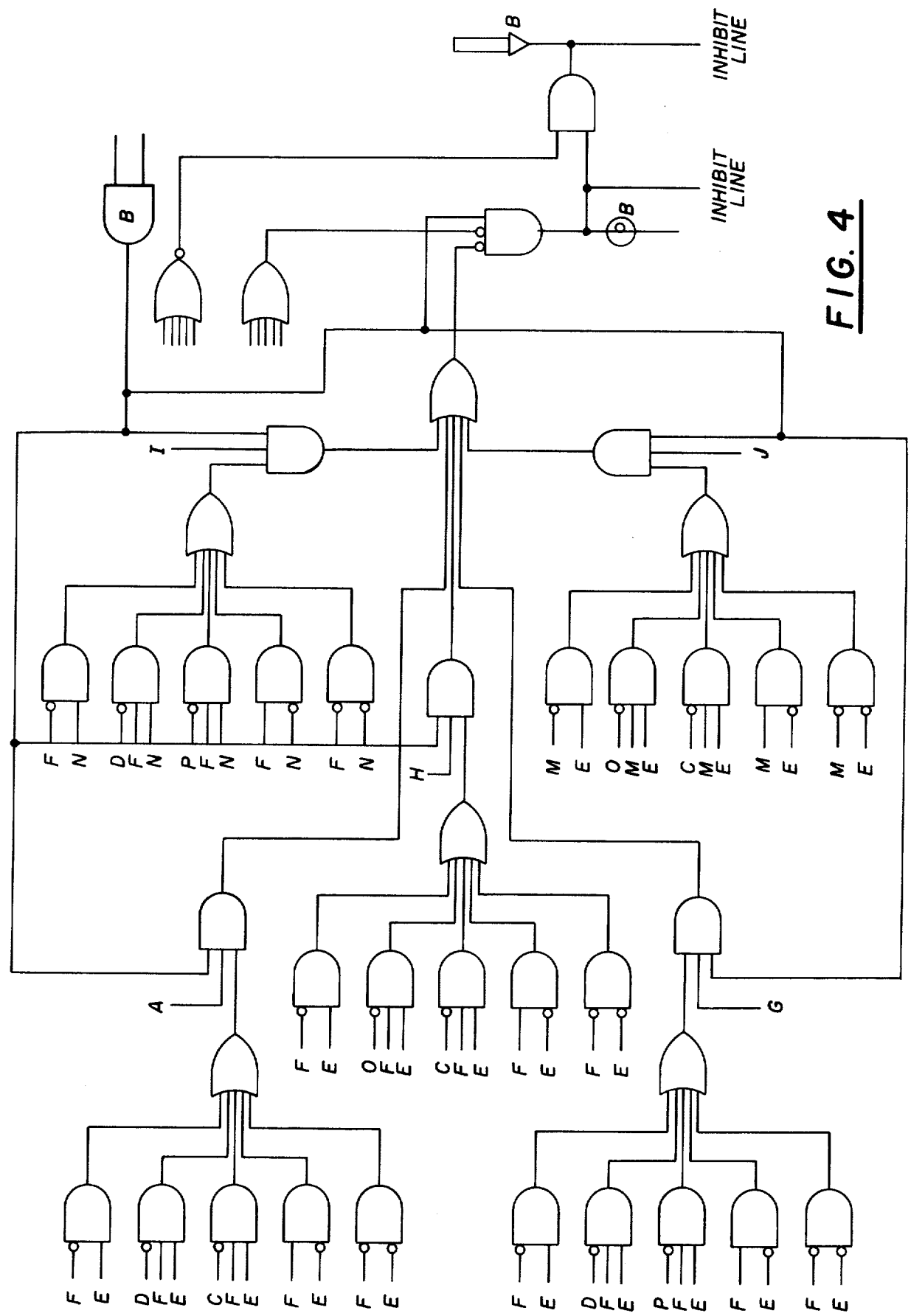
FIG. 4 is a block diagram of still a further modification of the embodiment of FIG. 1.

In order to provide for a built-in checking procedure to indicate a difference in sensitivity between the different sensing circuits, the modification shown in FIGS. 2, 3, and 4 are provided. FIGS. 2 and 6 depict the first configuration. FIG. 6 shows inner ring inhibit lines only, the outer ring or bearing indicator lights (shown as arrows 100-103) will have the same inhibit configuration as in FIG. 1 and as shown in FIG. 5. FIG. 2 is the logic diagram for the first modification with the AND gates labeled as second order AND gates in the hydrophone signal line (1-2, etc.). As shown in FIGS. 2 and 6, the hydrophone which receives the signal first inhibits or disables all but two that are on a perpendicular axis opposite from each other. In the example shown, lights A, B and D would light while C would not.

FIGS. 3 and 7 depict the second modification. FIG. 7 shows the inner light ring inhibit lines. The outer inhibit lines are as depicted in FIG. 5. FIG. 3 is the functional diagram of the second modification and begins with the first order AND gates of the hydrophone signal lines (1-1, 2-1, etc.). In the system of FIG. 3, the first hydrophone to be stimulated would inhibit all but the three opposite hydrophones. Out of these three, the last to receive the signal will be the only one to set. If the last hydrophone to receive stimulation is 180° from the first, there will be a fortification of the indicated bearing and very reliable information as to direction. If the last to receive stimulation is other than 180° from the first, it indicates either the bearing is between two hydrophones, or there is a sensitivity difference in the opposite hydrophone circuitry. Assuming it is not a difference in sensitivity, the bearing is between two hydrophones and the position of the last received signal will give a search direction from the displayed bearing.

FIGS. 4 and 8 depict the third modification, which is the same in principle, application and operation as the modification of FIG. 3 except that five opposite hydrophones are used rather than three and given the same results and information.

In the functional schematic diagram of FIGS. 2, 3, and 4, for simplicity, the light bulb that switches, holding flip-flop circuits and mode switches were omitted. However, it is understood that these are a part of the modification shown.

In FIG. 9, the same reference numerals as used in FIG. 1 are shown to help in understanding the operation of the system.

In operation, and referring to FIGS. 1 and 9 when a sound is detected by hydrophone No. 1 and is of a frequency to activate channel 1, light 44 is illuminated. The mode selector switch is for the automatic mode, so that light 57 and bearing readout 76 would be illuminated. Alarm channel lights are reset by reset buttons 46 while all bearing hold lights and all light bulb tests are reset by the same pushbuttons 78 and 43, respectively.

Obviously many modifications and variations of the present invention are possible in the light of the above teachings. It is therefore to be understood that within the scope of the appended claims the invention may be practiced otherwise than as specifically described.

What is claimed is:

1. A passive bearing to active sonar source detection apparatus comprising:
    a. a plurality of omnidirectional hydrophones equally and circularly spaced forming an array for receiving a sonar signal,
    b. a plurality of means coupled to said hydrophones for analyzing the frequency and amplitude of each signal successively received by each hydrophone,
    c. a plurality of means coupled to said analyzing means for gating a received signal only within a predetermined frequency band and amplitude,
    d. a plurality of means coupled to said gating means and being responsive to the output signal from said gating means for inhibiting all signals from hydrophones except signals from the hydrophone first receiving said gated signal,
    e. a plurality of indicating means coupled to said gating means for indicating which hydrophone first received said signal and providing a numerical display readout of the relative bearing of the first received signal.

2. The apparatus of claim 1 further comprising a plurality of alarm channels associated with said frequency analyzing means including indicating means for indicating the frequency range of said first received signal.

3. The apparatus of claim 1 wherein said indicating means includes means for switching said first received signal to a delayed duration mode, an automatic mode and a manual mode as selected by an operator.

4. The apparatus of claim 1 wherein said inhibiting means includes a gate coupled to each of said hydrophones and the first gate receiving a signal from a hydrophone generates a data output that is fed to all other gates for blocking any signal received by each of said other gates as long as the output signal persists from said first gate receiving a signal.

5. The apparatus of claim 2 wherein each of said alarm channels includes a filter circuit coupled to said hydrophones for passing a band of predetermined frequencies, pulse circuit forming means coupled to said filter circuit for generating an output pulse in response to a signal passed by said filter circuit, and an indicator lamp coupled to said pulse circuit forming means for illuminating in response to said pulse.

6. The apparatus of claim 1 wherein said gating means includes a first AND gate having a first input coupled to said hydrophones, a second input coupled to said frequency analyzing means and being responsive to signals received on said first and second input to generate an output pulse, a second AND gate having a first input for receiving an enabling signal and a second input coupled to the output of said first AND gate for generating an output pulse when a pulse is received from said first AND gate and an enabling signal is present at said first input, a third AND gate having a first input for receiving an enabling signal and a second input coupled to the output of said second AND gate for generating an output pulse when a pulse is received from said second AND gate and an enabling signal is present at said first input.

7. A passive bearing to active sonar source detection apparatus comprising:
   a. a plurality of omnidirectional hydrophones equally and circularly spaced forming an array for receiving a sonar signal,
   b. a plurality of means coupled to said hydrophones for analyzing the frequency and amplitude of each signal successively received by each hydrophone,
   c. a plurality of means coupled to said analyzing means for gating a received signal only within a predetermined frequency band and amplitude,
   d. a plurality of means coupled to said gating means and being responsive to the output from said gating means for inhibiting all but two of the signals from hydrophones that are perpendicular to the hydrophone first receiving said gated signal,
   e. a plurality of indicating means coupled to said gating means for indicating which hydrophone first received said signal and providing a numerical display readout of the relative bearing of the first received signal.

8. A passive bearing to active sonar source detection apparatus comprising:
   a. a plurality of omnidirectional hydrophones equally and circularly spaced forming an array for receiving a sonar signal,
   b. a plurality of means coupled to said hydrophones for analyzing the frequency and amplitude of each signal successively received by each hydrophone,
   c. a plurality of means coupled to said analyzing means for gating a received signal only within a predetermined frequency band and amplitude,
   d. a plurality of means coupled to said gating means and being responsive to the output signal from said gating means for inhibiting all but three of the signals from hydrophones that are perpendicular to the hydrophone first receiving said gated signal,
   e. a plurality of indicating means coupled to said gating means for indicating which hydrophone first received said signal and providing a numerical display readout of the relative bearing of the first received signal.

* * * * *